June 3, 1958     R. E. HAESLY     2,837,089

REAR TRUSS PAD

Filed Oct. 16, 1953

*INVENTOR.*
RUDOLPH E. HAESLY
BY
*Merrill M. Blackburn*

ATTORNEY

United States Patent Office 2,837,089
Patented June 3, 1958

2,837,089

REAR TRUSS PAD

Rudolph E. Haesly, Davenport, Iowa

Application October 16, 1953, Serial No. 386,511

5 Claims. (Cl. 128—106)

The present invention relates to a rear pad for a hernia truss. Among the objects of this invention are the provision of a rear pad for a hernia truss which can adjust itself to the natural curvatures of the surface of the body and easily follows body movement; the provision of a rear pad for a hernia truss which is designed to make the wearing of the truss especially comfortable; and such further objects, advantages, and capabilities as will hereafter appear and as are inherent in the construction disclosed herein.

My invention further resides in the combination, construction, and arrangement of parts illustrated in the accompanying drawing and, while I have shown therein what is now regarded as the preferred embodiment of this invention, I desire the same to be understood as illustrative only and not to be interpreted in a limiting sense.

In the drawings annexed hereto and forming a part hereof,

Figure 1:
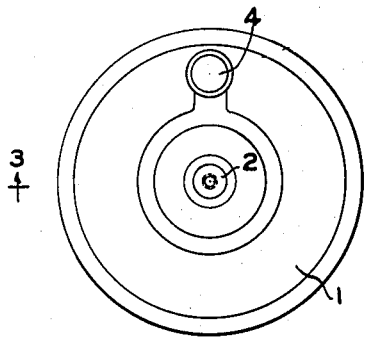
Fig. 1 shows a face view of the metal plate forming the base of the pad.
Figure 2:
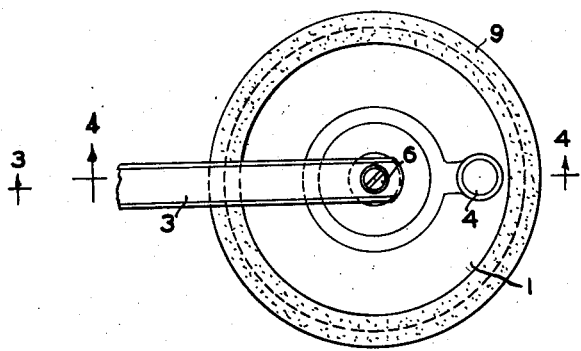
Fig. 2 shows an outside rear view of the completed pad.
Figure 3:
Fig. 3 shows a sectional view of the supporting plate, taken substantially along the plane indicated by the line 3—3, in Fig. 1.
Figure 4:
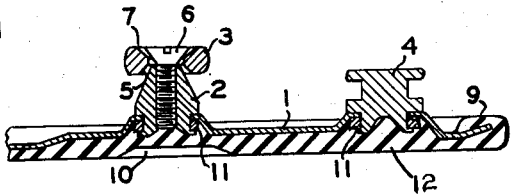
Fig. 4 shows a partial section of a pad, taken substantially along the plane indicated by the line 4—4, in Fig. 2.

Reference will now be made in greater detail to the annexed drawings for a more complete description of this invention. This rear truss pad is for use on the back or dorsal part of the body, approximately opposite the inguinal hernia pad. It comprises a thin, preferably resilient metal plate 1 for supporting a substantially flat pad of rubber or rubber-like material molded on the plate with the edge of the rubber overlapping the plate. Secured to the center of the back of this plate is a tapered stud 2 for loose attachment to the body spring 3 of the truss, in order that this pad may easily move with the natural movements of the body. The stud 2 is secured permanently to the metal plate 1, and a stud 4 is permanently secured toward one edge of the plate for attaching the strap which connects the two dorsal pads which position and hold the truss on the body. Each of said studs has a riveting washer 11, and they are riveted to the plate.

The plate 1 has a central depression 10 surrounded by a flat surface 12 with a flanged edge 9. The plate and the flat surface 12 may be made of one piece of any suitable material. The flat surface 12 of this pad, in conjunction with the central depression 10 and flanged edge 9, and with the loose fastening, permits the pad to adjust itself to the angle of the body, to follow body movements, and results in comfort to the wearer.

Preferably, the stud 2 has a taper of approximately sixty degrees (60°), and the spring 3 has a tapered hole 5, countersunk from both sides and of greater taper than that of the stud and screw head, being approximately eighty degrees (80°). The spring 3 is held to the stud by a screw 6 and may rock on the stud because of the difference in the tapers of the stud and the countersunk holes in the spring.

The rubber or rubber-like material, which is soft, pliable, and yieldable, and forms a flat surface 12 for the metal plate 1, the flat surface 12 having a flanged edge 9 overlapping the edge of the metal plate, and is soft, pliable, and yieldable and has a central depression 10 on the back thereof which permits the pad to straddle any protruding bony structure and assists in holding the pad in place on the body. This pad is light in weight and helps to produce a light-weight truss for the treatment of hernia.

It will be understood that the spring goes completely around the body, except for a small gap between the two ends at the back which are secured together by a strap of strong, flexible material. When on the body, the spring 3 is in line with the studs 2 and 4.

It is of course understood that the specific description of structure set forth above may be departed from without departing from the spirit of this invention as disclosed in this specification and as defined by the appended claims.

Having now described my invention, I claim:

1. A rear truss pad comprising a thin plate of resilient metal having an edge turned up slightly, a central stud projecting from one face thereof, said stud having an external conical surface, a body spring of a truss provided with a hole tapered from opposite faces of the spring in one end portion thereof, a screw having a tapered head, the hole through the spring being countersunk on both sides so that the spring has a loose connection with the stud whereby the plate may rock freely on the stud, said screw extending through said hole in the spring and into the stud, and one face of the plate being covered with a layer of soft, pliable, yieldable, rubber-like material.

2. In a rear truss pad, a thin foundation plate having a depression centrally, said depression being provided with a hole, an externally conical stud mounted, fixedly, in said hole, said stud being provided with a longitudinally extending screw-threaded opening therein, a body spring having a hole therethrough which is countersunk at both sides, a screw fastening said spring to said stud loosely so that the plate can rock in all directions, and a covering of soft, pliable, yieldable rubber-like material placed on said plate and slightly depressed centrally.

3. In a back pad for a truss, a foundation plate of thin resilient metal having a depression centrally, a stud mounted securely in said depression, said stud having a central screw-threaded aperture for the reception of a screw, a screw in said aperture in said stud, said screw having a tapered head, said stud being tapered outwardly from the plate so that the assembly of the stud and screw is smallest at the outer end of the stud, and a body spring of resilient material having an aperture therethrough which is countersunk from both sides at a greater angle than the angle of the stud and screw, the spring being connected to the stud, the aperture through the spring being larger than the screw, the taper of the stud being less than the taper of the aperture so that the plate can rock in any direction with relation to the spring, and an approximately flat layer of soft, pliable, yieldable, rubber-like material mounted on the face of the plate which is opposite the stud.

4. In a back pad for a truss, a thin plate of resilient metal, having on one face thereof a covering of soft material, the central portion of the plate being depressed and having an opening therethrough, a conically shaped stud mounted in said opening, a body spring, having an opening through an end portion thereof, mounted on said stud, the opening in the body spring being larger than the smallest diameter of the stud upon which mounted, said stud having a screw-threaded longitudinally extending opening, and a screw mounted in said opening, through the spring, and passing through the opening in the body spring to hold the body spring to the stud, the plate being so mounted as to be rockable in any direction.

5. In a back pad for a hernia truss, a flexible plate of suitable material having a central depression, a securing belt for holding the plate in position, a pair of studs secured on the back of the plate, one for attachment of the securing belt and the other for mounting a spring, said other stud being centrally located and being tapered from the body end out, ending in a cone of sixty degrees (60°), a screw mounted in said other stud and provided with a tapered head, a spring provided with countersunk openings from opposite sides, the openings having sloping sides, the inclination being about eighty degrees (80°), there being about a twenty degree (20°) difference in slope between the sides of the stud and the inclined surfaces of the countersink in the spring, whereby the plate may adjust itself to the angle of the body and follow body movements, the spring being loosely mounted on the stud.

References Cited in the file of this patent

UNITED STATES PATENTS

| | | |
|---|---|---|
| 82,001 | Hockert | Sept. 8, 1868 |
| 699,095 | Hardy | Apr. 29, 1902 |
| 1,889,367 | McNulty | Nov. 29, 1932 |
| 2,051,921 | Turner | Aug. 25, 1936 |